C. A. PATTON.
CORN HARVESTER.
APPLICATION FILED NOV. 13, 1908.
950,824.
Patented Mar. 1, 1910.
2 SHEETS—SHEET 1.
Fig. 1.
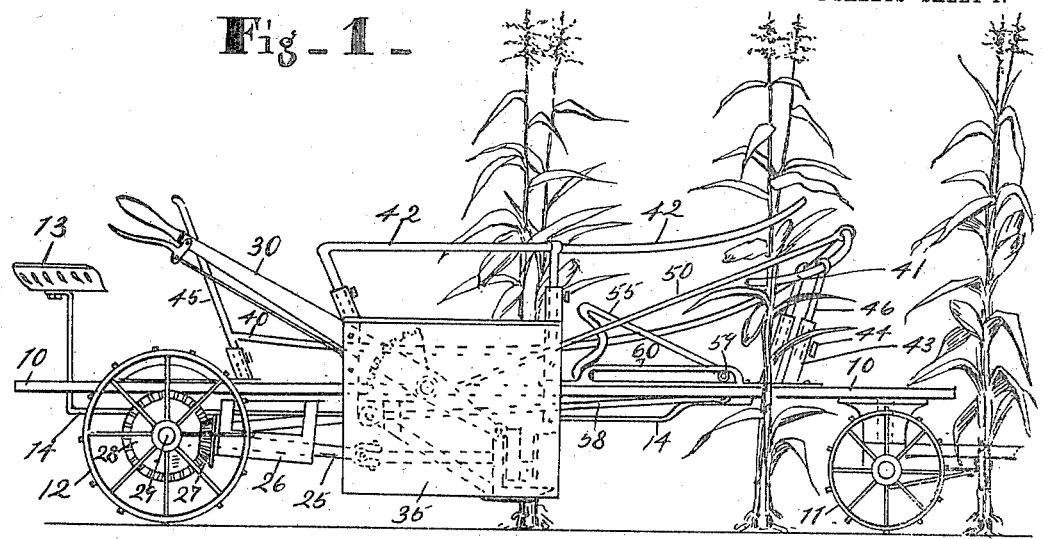
Fig. 2.
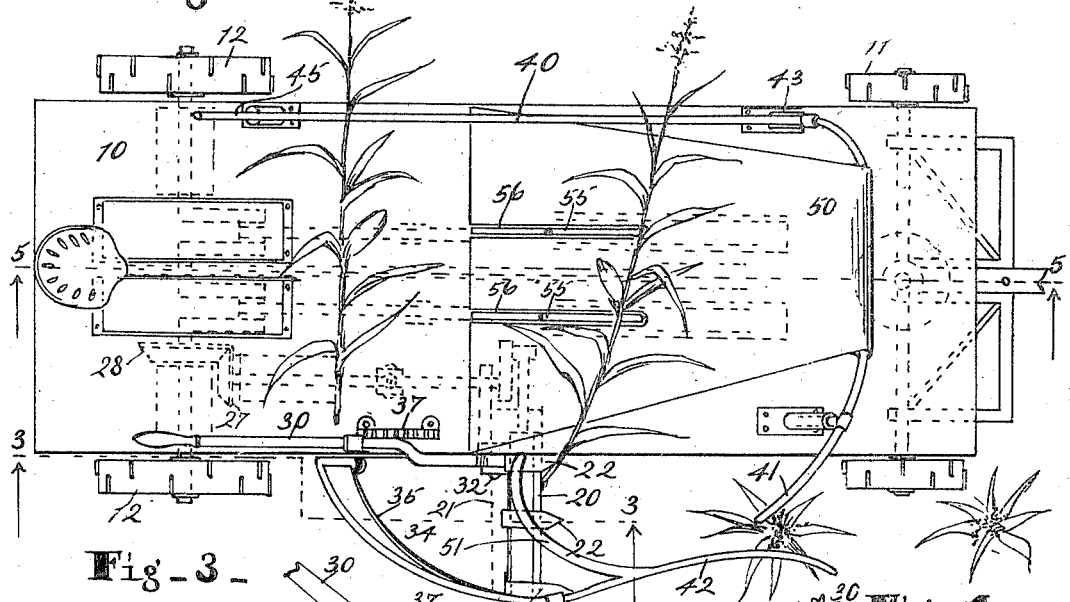
Fig. 3.
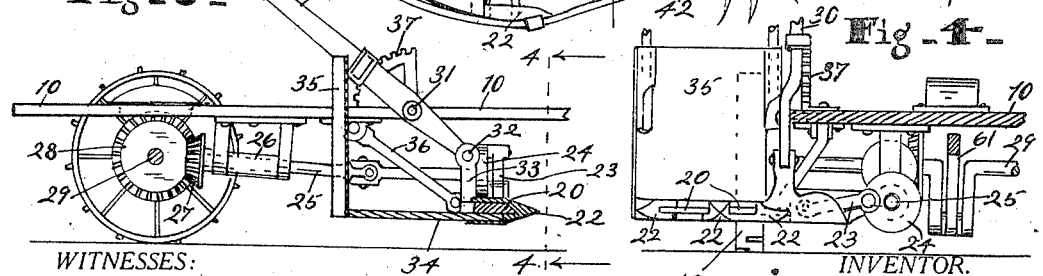
Fig. 4.
WITNESSES:
W. M. Gentle
O. M. Greener
INVENTOR.
Clarence A. Patton.
BY
V. H. Lockwood
ATTORNEY.

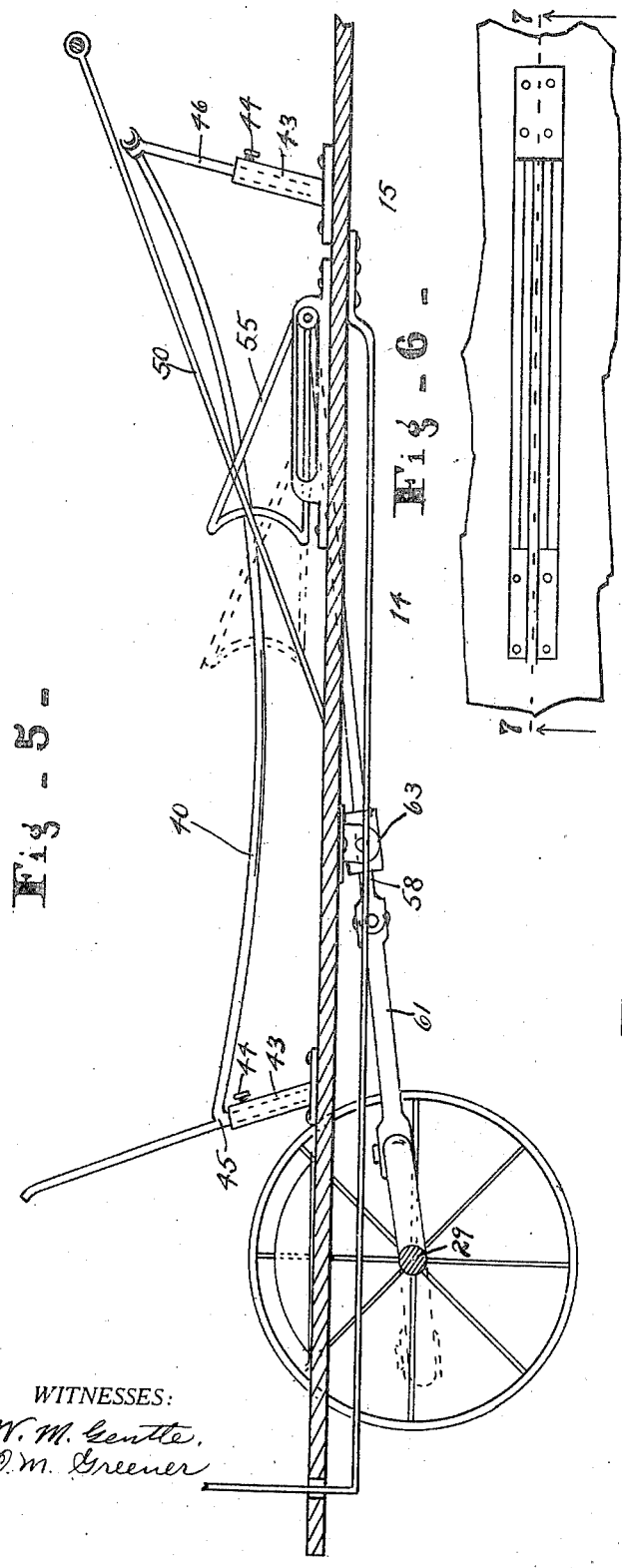

UNITED STATES PATENT OFFICE.

CLARENCE A. PATTON, OF BLOOMINGTON, INDIANA.

CORN-HARVESTER.

950,824.  Specification of Letters Patent.  Patented Mar. 1, 1910.

Application filed November 13, 1908. Serial No. 462,393.

*To all whom it may concern:*

Be it known that I, CLARENCE A. PATTON, of Bloomington, county of Monroe, and State of Indiana, have invented a certain new and useful Corn-Harvester; and I do hereby declare that the following is a full, clear, and exact description thereof, reference being had to the accompanying drawings, in which like numerals refer to like parts.

The object of this invention is to provide an improved means for harvesting corn stalks and the like.

One feature of the invention consists in means mounted in connection with the platform across which the stalks fall for moving the stalks as they fall into one place so as to bunch the same.

Along with the foregoing another feature consists in providing means for throwing the stalk across the platform when it is cut.

Still another feature of the invention consists in providing a reciprocating knife and guards in connection with which it operates, so that the knife will be sure to sever the corn stalk quickly and prevent the stalk from being pulled up by the roots.

The full nature of this invention will be understood from the accompanying drawings and the following description and claims.

In the drawings Figure 1 is a side elevation of the device and also some standing stalks of corn. Fig. 2 is a plan view of the same, showing one stalk cut and one just after it has been cut. Fig. 3 is a section on the line 3—3 of Fig. 2. Fig. 4 is a section on the line 4—4 of Fig. 3, showing the cutting mechanism in elevation. Fig. 5 is a section on the line 5—5 of Fig. 2, showing the bunching mechanism and other parts in side elevation. Fig. 6 is a plan view of one of the bunchers and the associated part of the platform. Fig. 7 is a section on the line 7—7 of Fig. 6. Figs. 8 and 9 are sections on the lines 8—8 and 9—9 of Fig. 7.

This machine includes a suitable platform 10, mounted on front wheels 11 and rear wheels 12. There is a seat 13 at the rear of the machine and supported upon the rear end of the long spring bar 14, that is connected with the under side of the platform at 15, see Figs. 1 and 5, near the front end of the platform, so that although the seat is yieldingly mounted, all the weight thereof acts on the platform toward the front end and, therefore, tends to hold the front wheels down in engagement with the earth and prevent them from slipping laterally. In other words, this construction of the seat permits it to be at the rear of the front wheels and yet the weight therefrom is exerted on the frame in front of the rear wheels and in fact near the front wheels.

A cutter or knife 20 extends laterally from about the middle of the right hand side of the platform, it being a straight knife mounted reciprocatorily on the knife bar 21 which is provided with three guards 22 located equi-distant from each other. The purpose of this construction is to facilitate the severing of the corn stalk by reason of its engagement between the knife and the fender so that the corn stalk will not be pulled up by the roots. This construction also avoids the location of the knife in an inclined position. The knife is reciprocably driven by the pitman 23 and eccentric 24, on a shaft 25 which is jointed between its ends, the rear portion being mounted in the brackets 26 and at its extreme rear end said shaft has a beveled gear 27 meshing with the bevel gear 28, secured on the rear axle 29. The elevation of the cutting mechanism is adjusted and maintained by the lever 30, fulcrumed at 31 to the platform and at its lower end pivoted at 32 to the arm 33 connected with the shoe 34. This shoe has a rear, upwardly extending portion 35. A link 36 is pivotally connected at one end with the bottom of the platform and at the other end to the shoe, as seen in Figs. 3 and 4, in order to strengthen the construction while in use. The segmental rack 37 is mounted on the platform in position to be engaged by the lever 30 and so as to hold the lever in adjusted positions. This knife construction enables a simple, straight, smooth-edged knife to be used by the coöperation therewith of the guards 22 situated a few inches from each other, so that the reciprocation of the knife will move the stalk of corn quickly into engagement with the guard and in that position the stalk will be quickly cut.

The platform has an elevated guard 40 extending along the left hand edge, as seen in Figs. 2 and 5. Said guard-rail is extended across the front and has at its extreme right hand end a guide 41 that extends rearwardly at an inclination, as seen in Fig. 2. Another guide 42 coöperates with said guide 41 to straighten the corn stalks as they approach the knife. The guard rail 40 is vertically adjustable in tubes 43 extending upwardly and having set screws 44 to engage downwardly extending rods 45 and 46 that support the guard rail. A plate 50 lies transversely of the platform with its rear end upon the platform about midway and its front end pivotally mounted on the front portion of the guard rail 40. Said plate 50 is tapering from its rear end to its front end, the rear end being as wide as the platform. This plate 50 slants downwardly toward the rear of the machine so that corn stalks which fall across it would tend by gravity to slide or move downwardly toward the rear of the machine. The corn stalks as they are cut are thrown across the plate 50 by the guide rail 51, which is a rearward extension of the guide 42 and it extends not only rearwardly but is curved inwardly toward the rear part of the platform and at a considerable elevation, as seen in Fig. 2, so that the stalk as it is cut will be engaged by said guide rod 51 and pushed laterally across the machine.

As the stalks are thrown across the inclined plate 50 they are pushed rearwardly by what may be termed "bunchers" 55. These are triangularly shaped structures or frames and are formed preferably of a rod with the wide end of the triangle extending rearwardly of the machine and one corner of the triangle projecting through a slot 56 in the plate 50. There are two of these bunchers, one on each side of the middle of the machine. The rear ends of the bunchers are formed concave so that, as the bunchers are pushed rearwardly, they will always push or feed the corn stalks rearwardly, and if a corn stalk falls upon the plate 50 to the front of the buncher, as the buncher moves forwardly, it will pass from under the corn stalk so that the corn stalk will fall to the rear of it and then as the buncher moves to the rear it will push the corn stalk to the rear. The buncher is reciprocated by the rod 58 that is connected with the front end frame 59 of the buncher 55, as seen in Figs. 7 and 8. The frame 59 slides in the longitudinally slotted guide-way 60 mounted upon the platform 10, as seen in Fig. 7. The rods 58 are actuated by the crank portions of the rear axle 29 of the machine which is cranked at two places, one on each side of the center of the machine, as seen in Fig. 2. There is an intermediate bar 61 between the crank or the crank axle 29 and the rear end of the rod 58, as seen in Fig. 5, and the rods 58 and bars 61 are pivoted together and the rods 58 are guided by guides 63 secured to the bottom of the platform. The two bunchers move rearwardly or forwardly simultaneously and as has been stated, will bunch the corn stalks at the rear part of the platform immediately in front of the seat, so that the occupant of the seat can reach down and readily pick up the bunch of corn.

What I claim as my invention and desire to secure by Letters Patent is:

1. A corn harvester including a platform, a guard rail extending about the platform at an elevation therefrom, a plate mounted in connection with the guard rail at the front of the platform and inclined downwardly toward the rear and longitudinally slotted, bunchers projecting through the slots in said plate, and means for reciprocating said bunchers longitudinally of the machine.

2. A corn harvester including a platform, a plate inclined downwardly toward the rear of the platform and longitudinally slotted, longitudinally reciprocable bunchers mounted in connection with the platform and projecting through the slots in said plate, whereby the stalks of corn which fall across said plate will be moved to the rear to form a bunch, a cutter mechanism projecting laterally from said platform opposite said plate, and a guide rod that tends to throw the stalks as they are cut across said plate.

In witness whereof, I have hereunto affixed my signature in the presence of the witnesses herein named.

CLARENCE A. PATTON.

Witnesses:
O. M. GREENER,
O. M. McLAUGHLIN.